(12) United States Patent
Kim

(10) Patent No.: US 11,316,859 B2
(45) Date of Patent: Apr. 26, 2022

(54) WORK SUPPORT SYSTEM AND METHOD WITH DEVICE SHARING AND DEVELOPMENT SYSTEM FOR MULTI-PLATFORM APPLICATION

(71) Applicant: Inswave Systems Co., Ltd., Seoul (KR)

(72) Inventor: Wooglae Kim, Seoul (KR)

(73) Assignee: Inswave Systems Co., Ltd., Seoul (KR)

( * ) Notice: Subject to any disclaimer, the term of this patent is extended or adjusted under 35 U.S.C. 154(b) by 0 days.

(21) Appl. No.: 17/395,321

(22) Filed: Aug. 5, 2021

(65) Prior Publication Data

US 2022/0070170 A1 Mar. 3, 2022

(30) Foreign Application Priority Data

Aug. 31, 2020 (KR) .................. 10-2020-0110141

(51) Int. Cl.
*H04L 9/40* (2022.01)
*H04L 67/30* (2022.01)
*H04L 67/08* (2022.01)
*H04L 29/06* (2006.01)

(52) U.S. Cl.
CPC ........ *H04L 63/101* (2013.01); *H04L 63/0281* (2013.01); *H04L 63/102* (2013.01); *H04L 63/107* (2013.01); *H04L 67/08* (2013.01); *H04L 67/30* (2013.01)

(58) Field of Classification Search
CPC .. H04L 63/101; H04L 63/0281; H04L 63/107
See application file for complete search history.

(56) References Cited

U.S. PATENT DOCUMENTS

| | | | |
|---|---|---|---|
| 10,554,697 B1 * | 2/2020 | Ledet | H04L 65/4015 |
| 2003/0216143 A1 * | 11/2003 | Roese | H04L 67/18 455/456.2 |
| 2003/0221122 A1 * | 11/2003 | Hatori | H04L 63/102 726/3 |
| 2013/0088605 A1 * | 4/2013 | Quarfordt | H04W 8/005 348/207.1 |

(Continued)

FOREIGN PATENT DOCUMENTS

| | | |
|---|---|---|
| JP | 2004-341863 A | 12/2004 |
| JP | 2020-101852 A | 7/2020 |

(Continued)

*Primary Examiner* — Harris C Wang
(74) *Attorney, Agent, or Firm* — IP & T Group LLP

(57) ABSTRACT

Work support system and method with device sharing and development system for multi-platform application disclosed. The work support system with device sharing may include a user terminal in which a service application is installed and executed, a device configured for executing a predetermined operation according to a control command, a device terminal directly connected to the device, and a device sharing server configured for enabling the user terminal to use the device by communicating with the user terminal and the device terminal, managing information of the device that is sharable, and allowing a sharing of the device under a predetermined condition in response to a request from the user terminal.

5 Claims, 11 Drawing Sheets

(56) References Cited

U.S. PATENT DOCUMENTS

| | | | |
|---|---|---|---|
| 2015/0070725 A1* | 3/2015 | Monden | G06F 3/1292 358/1.15 |
| 2017/0322892 A1* | 11/2017 | Kobayashi | G06F 13/10 |
| 2018/0070407 A1* | 3/2018 | Oh | H04M 1/72412 |
| 2018/0165045 A1* | 6/2018 | Hagiwara | H04N 1/4413 |
| 2020/0134332 A1* | 4/2020 | Vossoughi | G08G 1/144 |
| 2020/0250896 A1* | 8/2020 | Vossoughi | H04W 4/24 |

FOREIGN PATENT DOCUMENTS

| | | |
|---|---|---|
| KR | 10-2012-0063366 A | 6/2012 |
| KR | 10-2012-0117213 A | 10/2012 |
| KR | 10-2014-0069520 A | 6/2014 |
| KR | 10-1639991 B1 | 7/2016 |
| KR | 10-2019-0056692 A | 5/2019 |
| KR | 10-2020-0033687 A | 3/2020 |

\* cited by examiner

WORK SUPPORT SYSTEM AND METHOD WITH DEVICE SHARING AND DEVELOPMENT SYSTEM FOR MULTI-PLATFORM APPLICATION

CROSS-REFERENCE TO RELATED APPLICATION

The present application claims priority under 35 U.S.C. § 119(a) to Korean patent application number 10-2020-0110141 filed on Aug. 31, 2020, which is incorporated herein by reference in its entirety.

FIELD OF INVENTION

The present invention relates to a work support system and method, and more particularly, a work support system and method of enabling efficient work performance with device sharing and development system for multi-platform application.

BACKGROUND

Recently, digital transformation has been in the spotlight. Digital transformation refers to the digital transformation of business operations, including our daily lives, using new digital technologies.

Companies/agencies are changing to using the cloud provided as a service without building a server or operating environment on their own. Using a cloud service means that data or resources exist in an external cloud.

This is bringing about a change to a new way of working, such as cooperation and sharing through mobile devices such as smartphones, and the need for work programs that may support collaboration and sharing to adapt the change is rapidly increasing.

Currently, the market is divided into platforms for mobile app development and desktop application platforms. In the mobile ecosystem, the emergence of incompatible mobile operating systems such as Apple's iOS and Google's Android has increased the burden of developing application for specific operating systems, a hybrid app that may easily develop a single app that may be efficiently performed on various platforms such as iOS, Android, and Windows with one development have begun to gain attention.

However, cloud-based development/operation tools that can support mobile and desktop integration have not yet been commercialized.

OBJECTIVES OF INVENTION

This invention is intended to provide a work support system and method with device sharing that enables faster and more accurate work processing and improves work efficiency by facilitating a user who is not directly connected to a hardware device to enable device sharing.

This invention is also intended to provide a multi-platform application development system that supports the development of applications that enable work support with device sharing for terminals having various platforms.

Other objectives and advantages will be easily understood from the following description.

SUMMARY OF INVENTION

According to one aspect of the present invention, there is provided a work support system with device sharing. The work support system with device sharing may include a user terminal in which a service application is installed and executed, a device terminal directly connected to the device, and a device sharing server configured for enabling the user terminal to use the device by communicating with the user terminal and the device terminal, managing information of the device that is sharable, and allowing a sharing of the device under a predetermined condition in response to a request for sharing device from the user terminal.

In one embodiment, the first network through which the device sharing server is connected to the user terminal and the second network through which the device sharing server may be connected to the device terminal are different from each other.

In one embodiment, the device sharing server may perform a device directory function and a proxy server function for transmitting device control information.

In one embodiment, the device sharing server may include a device directory management unit configured for registering and managing the device that is shareable in a device directory, a device status check unit configured for checking and updating a current status of the device registered in the device directory, and a device control unit configured for, when receiving the request for sharing device from the user terminal, checking the device directory to confirm a right of a user who sent the request for sharing device, and enabling access control within a range corresponding to the right.

In one embodiment, one or more of an identification information of the device, a connected terminal information of the device terminal directly connected to the device, shareable users and/or groups, and a right setting information for each right may be synchronized and stored in the device directory.

In one embodiment, the device status check unit receives and updates a device status information including one or more of a device use availability and device location from the device terminal at the request of the device status check unit or at preset intervals.

In one embodiment, the device control unit may compare a location information of the user included in the request for sharing device with a location of the device registered in the device directory so that a device in a relatively short distance is given high priority.

In one embodiment, the user terminal is an employee terminal, and the customer terminal and the employee terminal perform a screen sharing.

According to another aspect of the present invention, there is provided a work support method performed in a device sharing server of a work support system. The work support method may include, receiving a device information from a device terminal and performing a device registration when a device to be shared is connected to the device terminal, synchronizing the device information to a device directory, receiving a request for sharing device from a user terminal, generating a device list in which a priority of the device is set based on a right of a user corresponding to the request for sharing device and a location information of the device with reference to the device directory to transmit the device list to the user terminal, receiving a request for shared use for the device in the device list from the user terminal, and transmitting a control command according to the request for shared use to the device terminal to control the device according to the control command.

In one embodiment, the generating the device list may include checking the device directory to see if the user has a right to use the device, retrieving adjacent device terminal based on the user's network information and GPS location information, and generating the device list by assigning priority according to an availability of the device that is checked through a device status information to the device that is connected to the adjacent device terminal and sorting by the priority.

Other aspects, features, and advantages will be more apparent from accompanying drawings, claims and detailed description.

EFFECTS OF INVENTION

According to an embodiment of the present invention, there is an effect of enabling faster and more accurate work processing and improving work efficiency by facilitating a user who is not directly connected to a hardware device to enable device sharing.

In addition, there is an effect of supporting the development of applications that enable work support with device sharing for terminals having various platforms.

BRIEF DESCRIPTION OF ACCOMPANYING DRAWINGS

Figure 3:
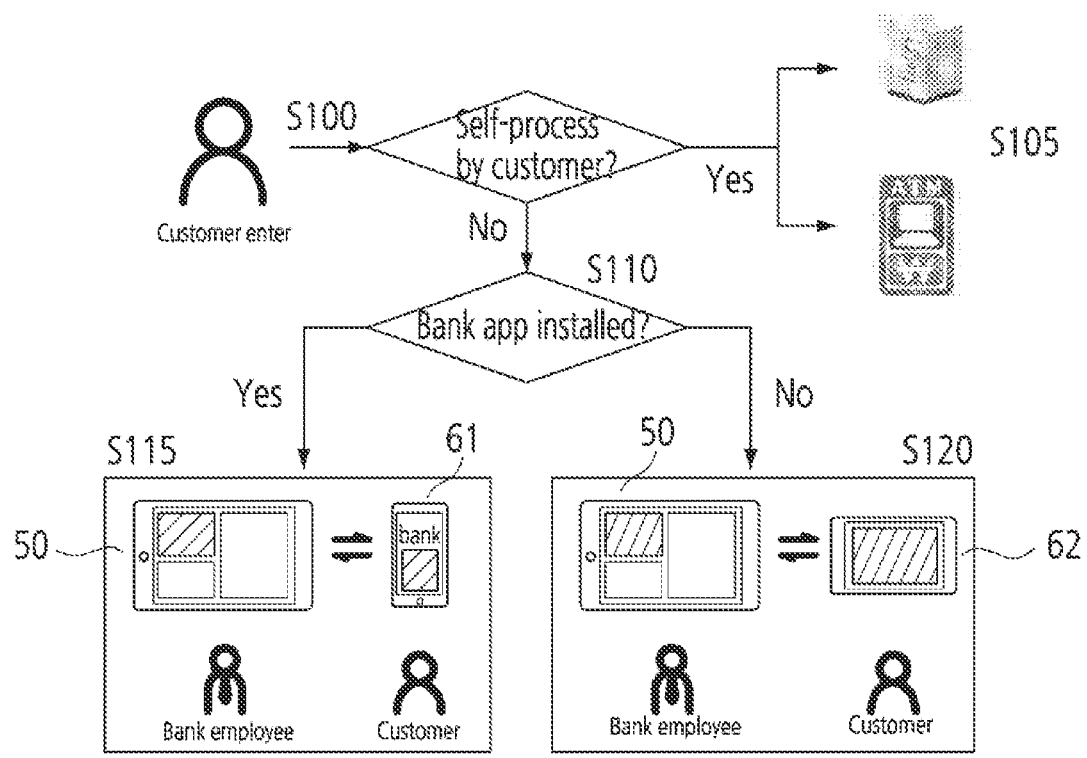
Figure 4:
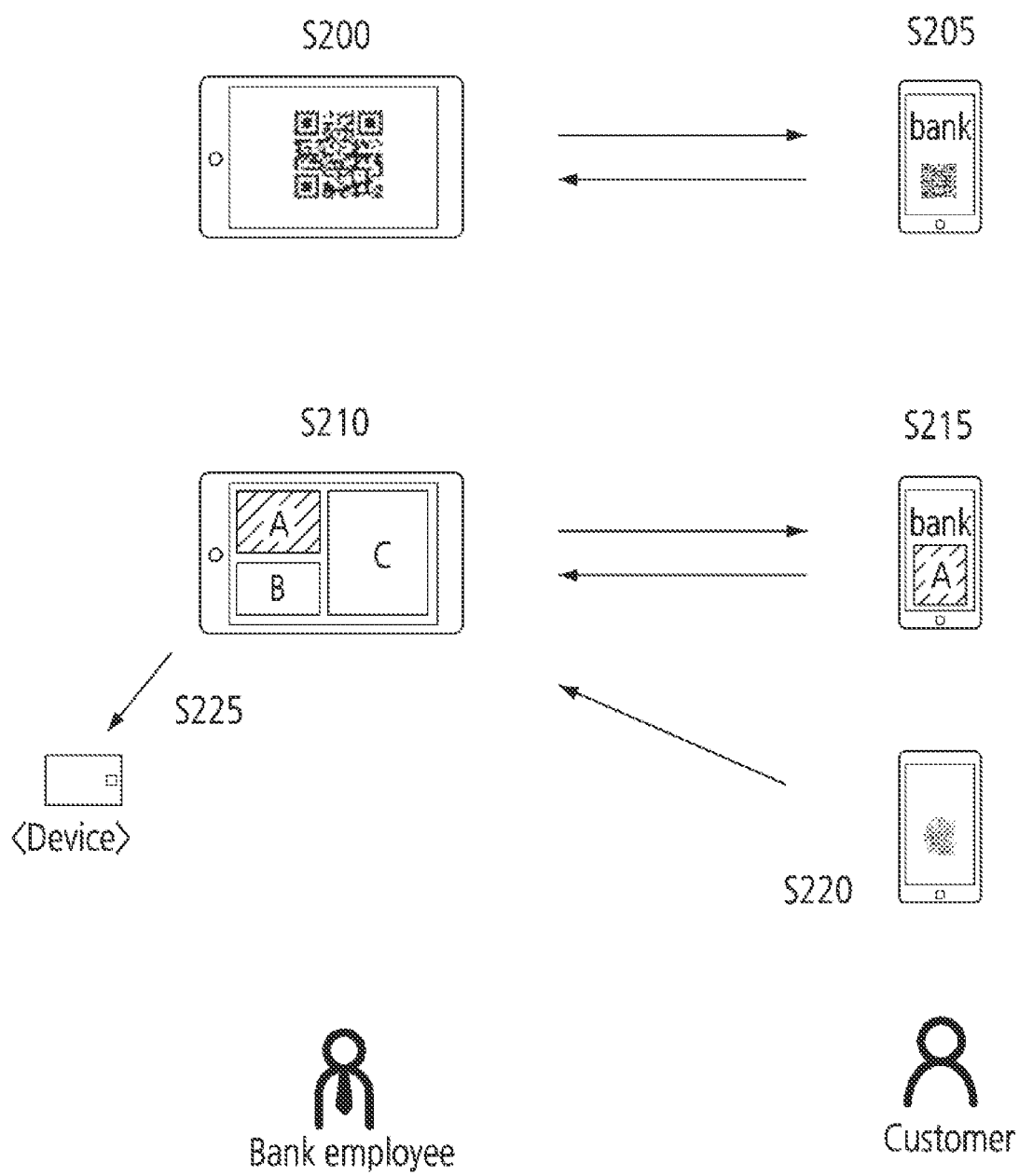
Figure 5:
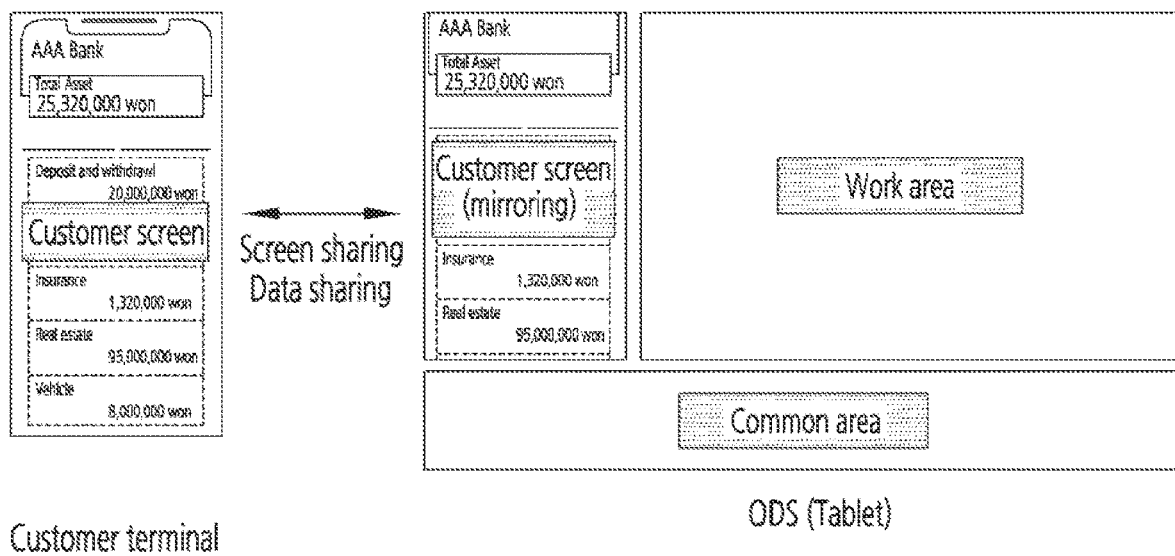
Figure 6:
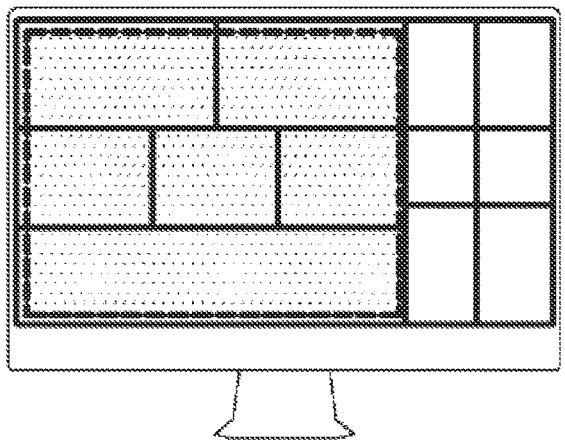
Figure 6:
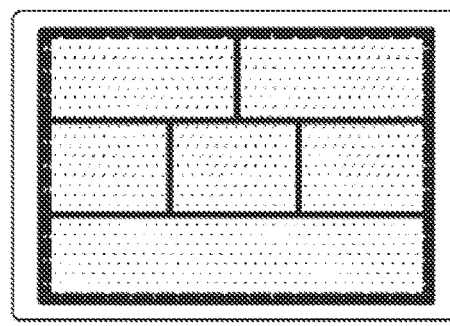
Figure 6:
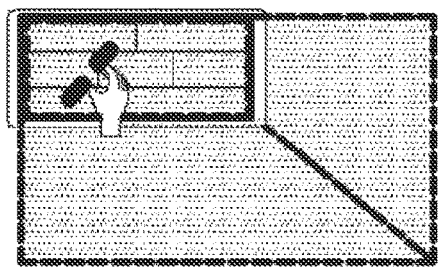
Figure 7:
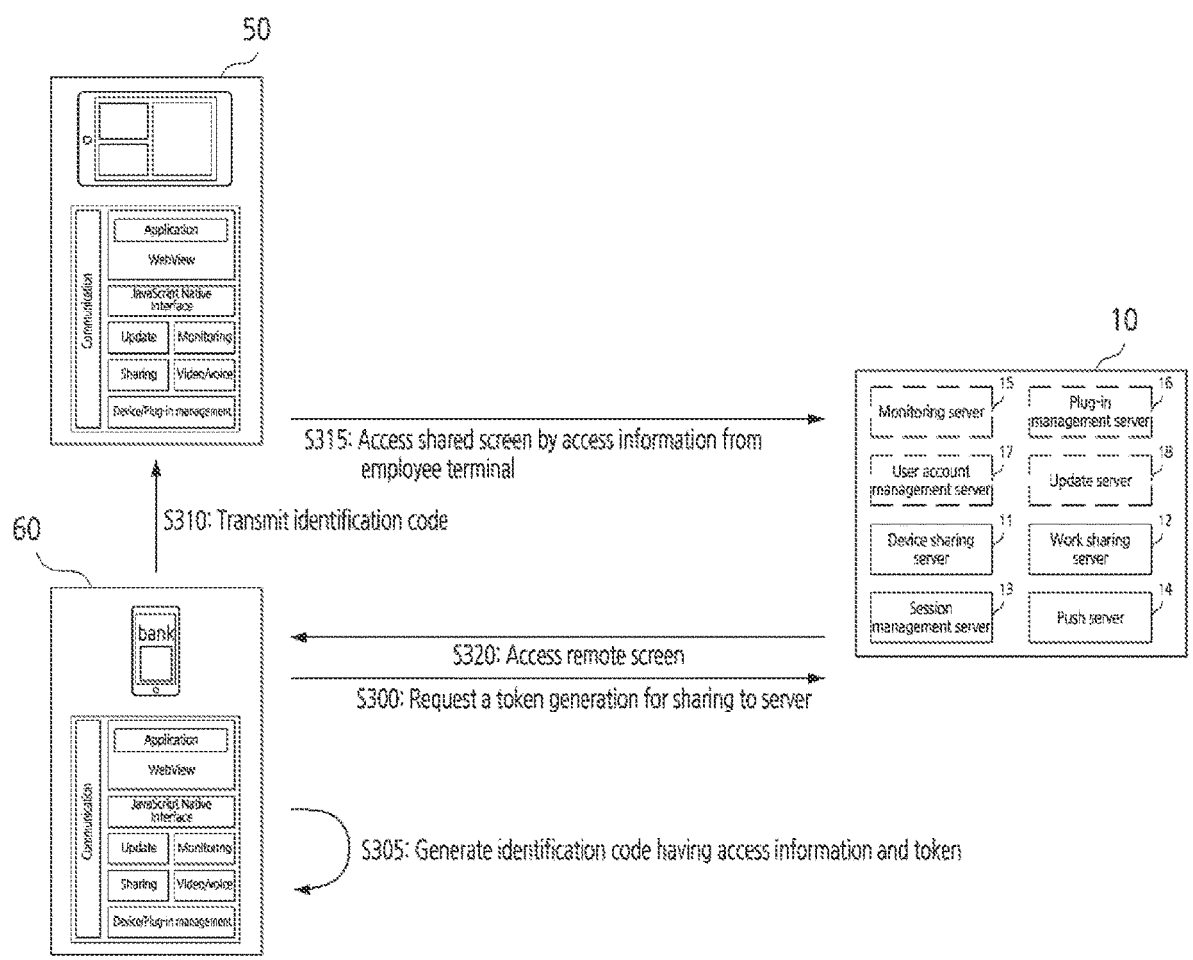
Figure 8:
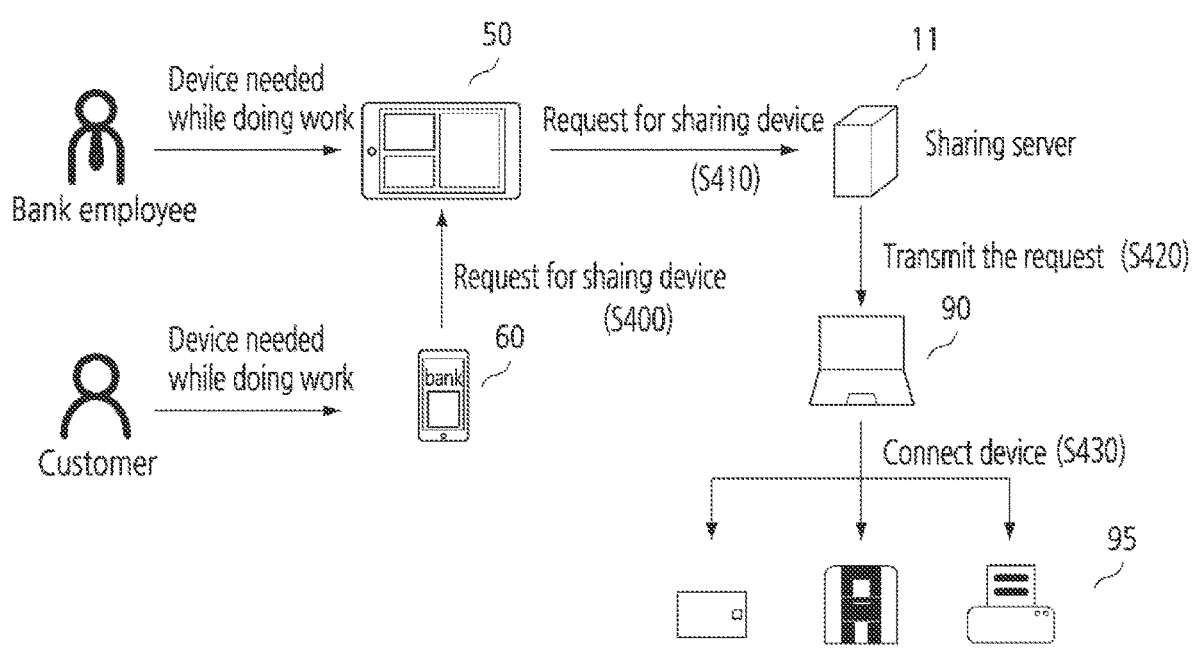
Figure 9:
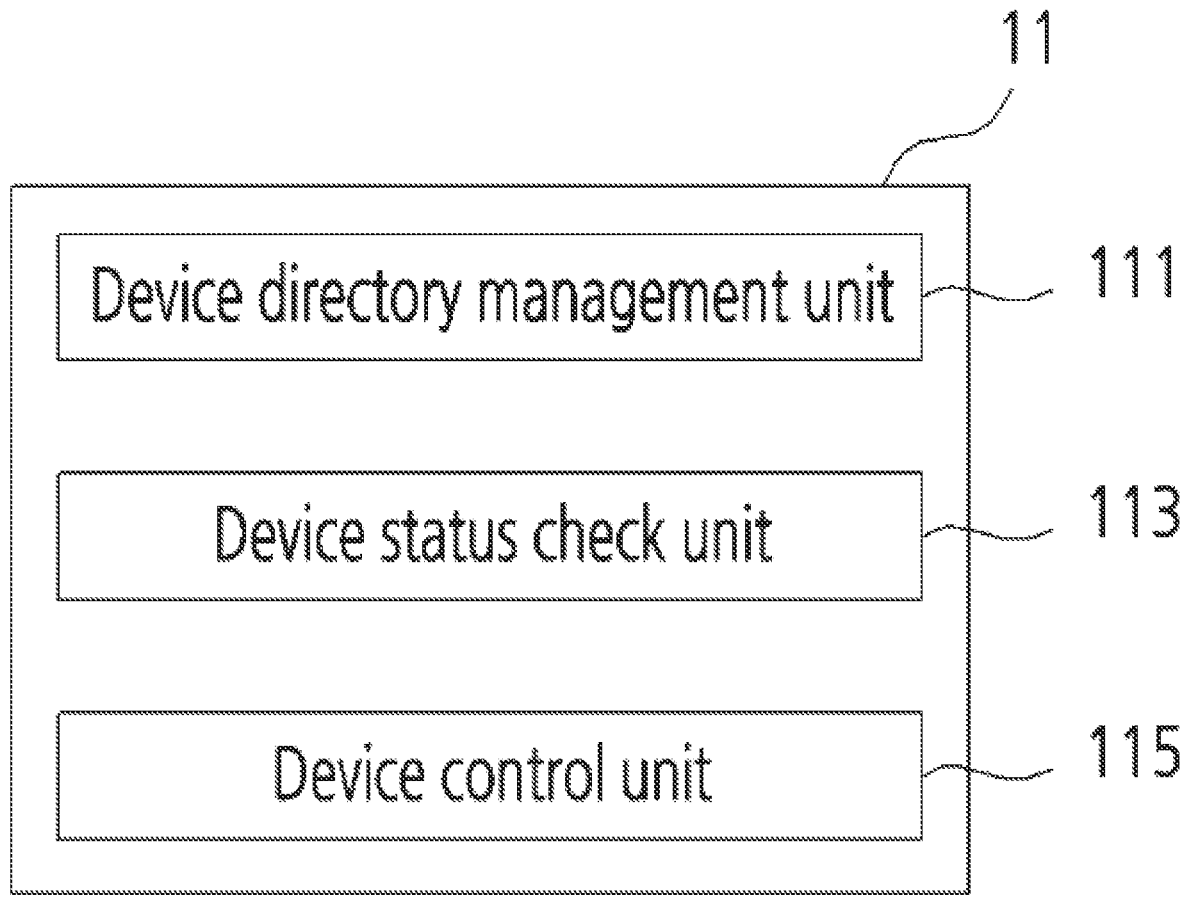
Figure 10:
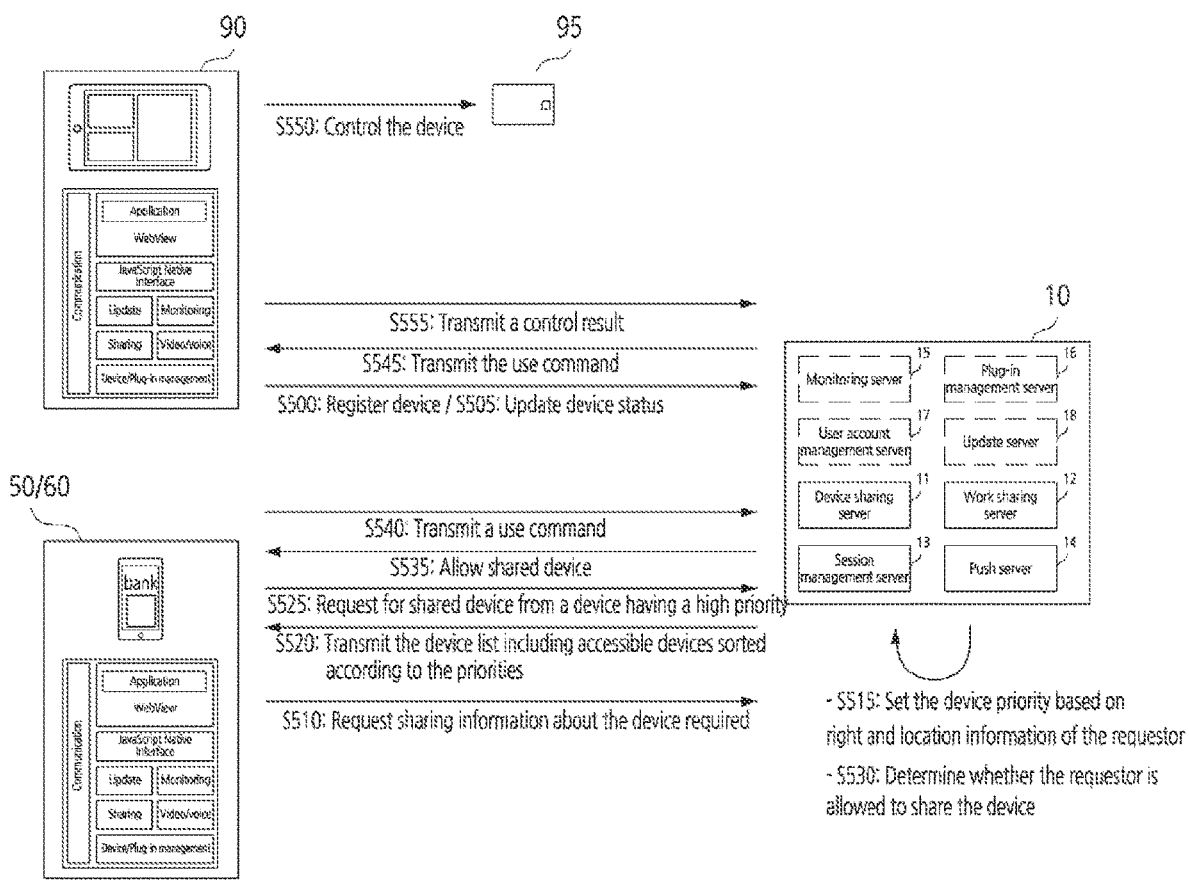

FIG. 3 and FIG. 4 exemplarily illustrate a work support process with screen sharing according to one embodiment of the present invention;

FIG. 5 exemplarily illustrates a work screen sharing between a customer terminal and an employee terminal;

FIG. 6 exemplarily illustrates screen views;

FIG. 7 exemplarily illustrates a screen sharing process for work support;

FIG. 8 exemplarily illustrates a work support process with device sharing according to one embodiment of the present invention;

FIG. 9 exemplarily illustrates a block diagram of device sharing server;

FIG. 10 exemplarily illustrates the method for shared use of device; and

Figure 11:
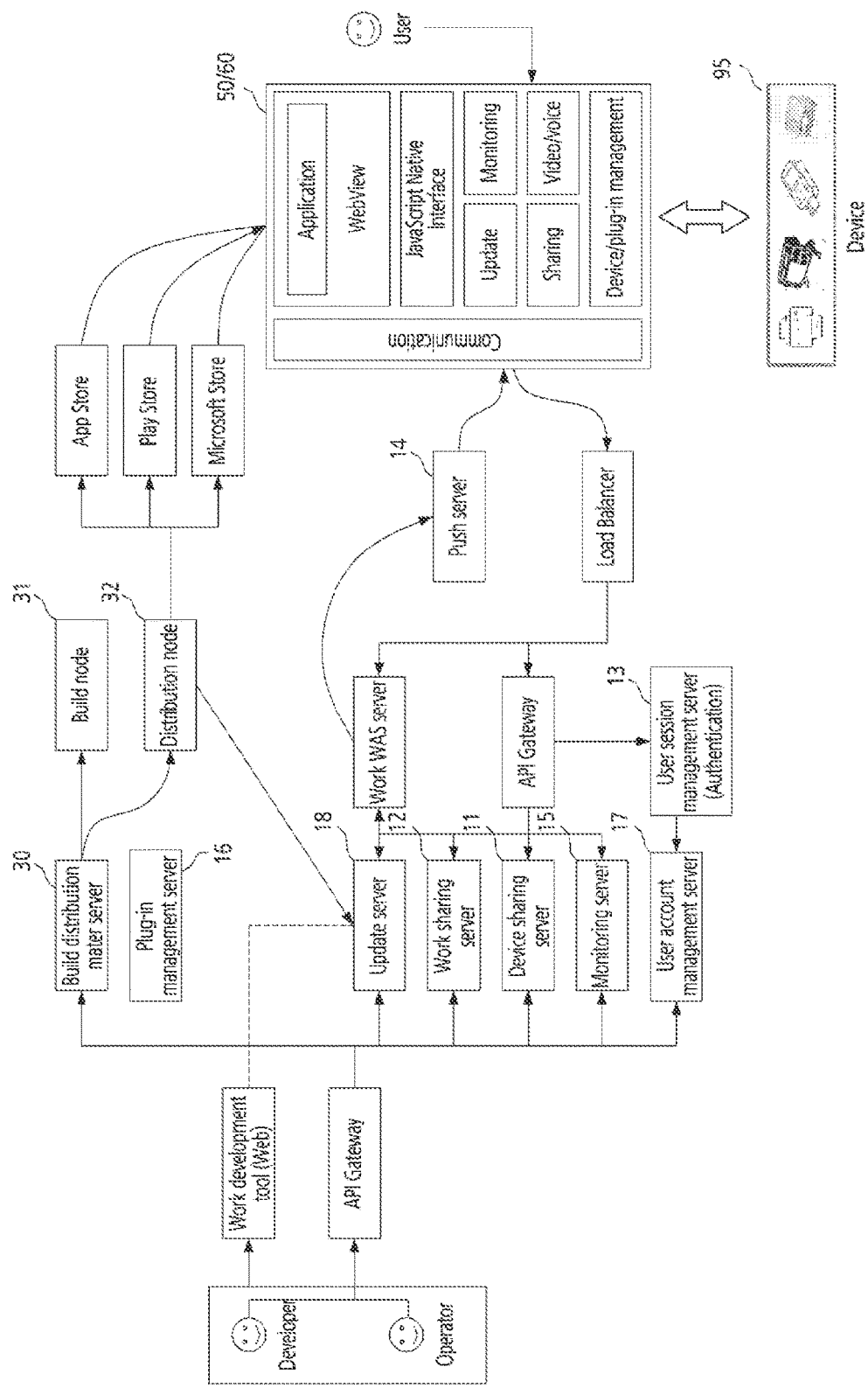

FIG. 11 exemplarily illustrates an architecture of a multi-platform application development system according to another embodiment of the present invention.

DETAILED DESCRIPTION

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these elements should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Terms such as ~part, ~unit, ~module mean an element configured for performing a function or an operation. This may be implemented in hardware, software or combination thereof.

Figure 1:
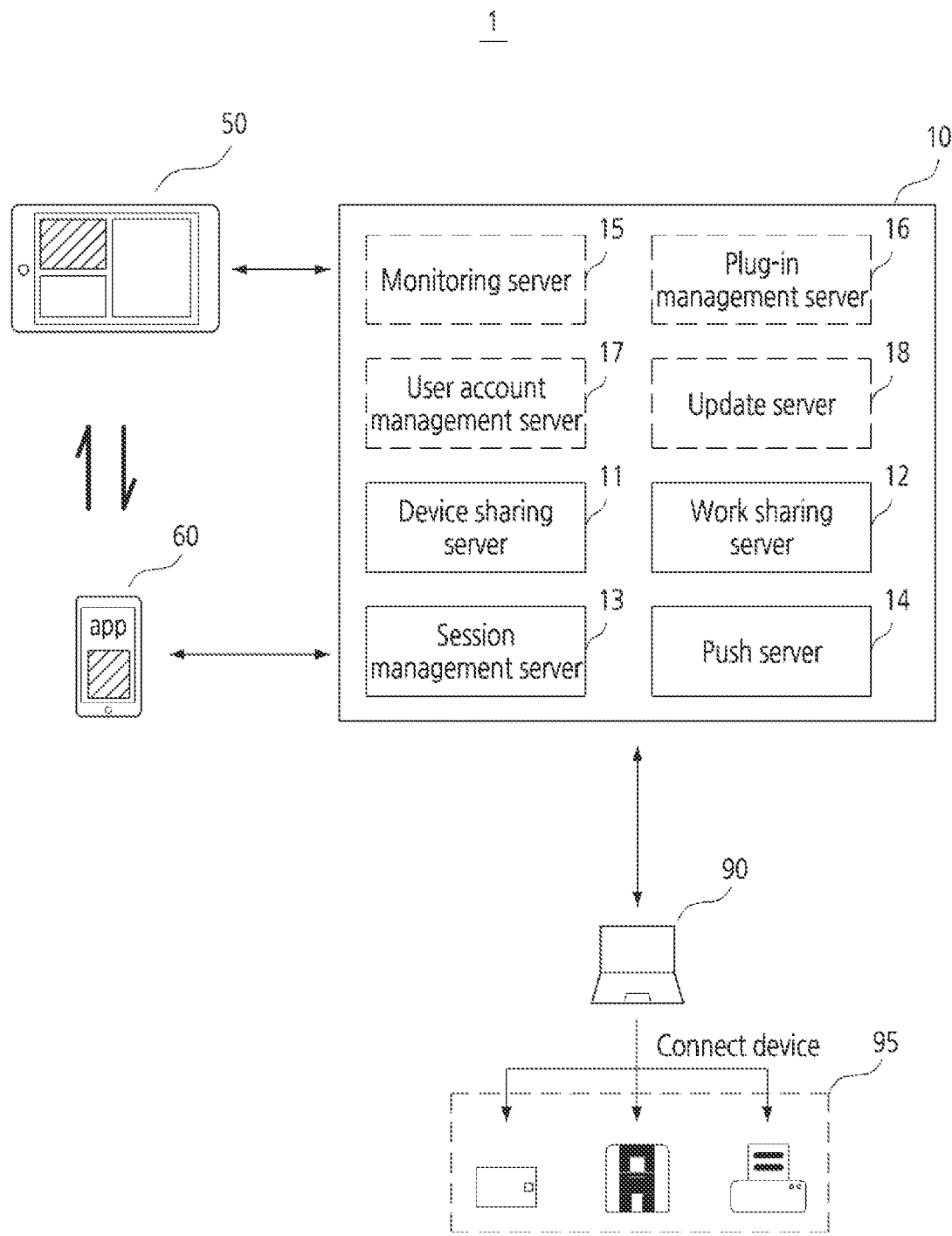
FIG. 1 is a schematic diagram of a work support system with device sharing according to one embodiment of the present invention.
Figure 2:
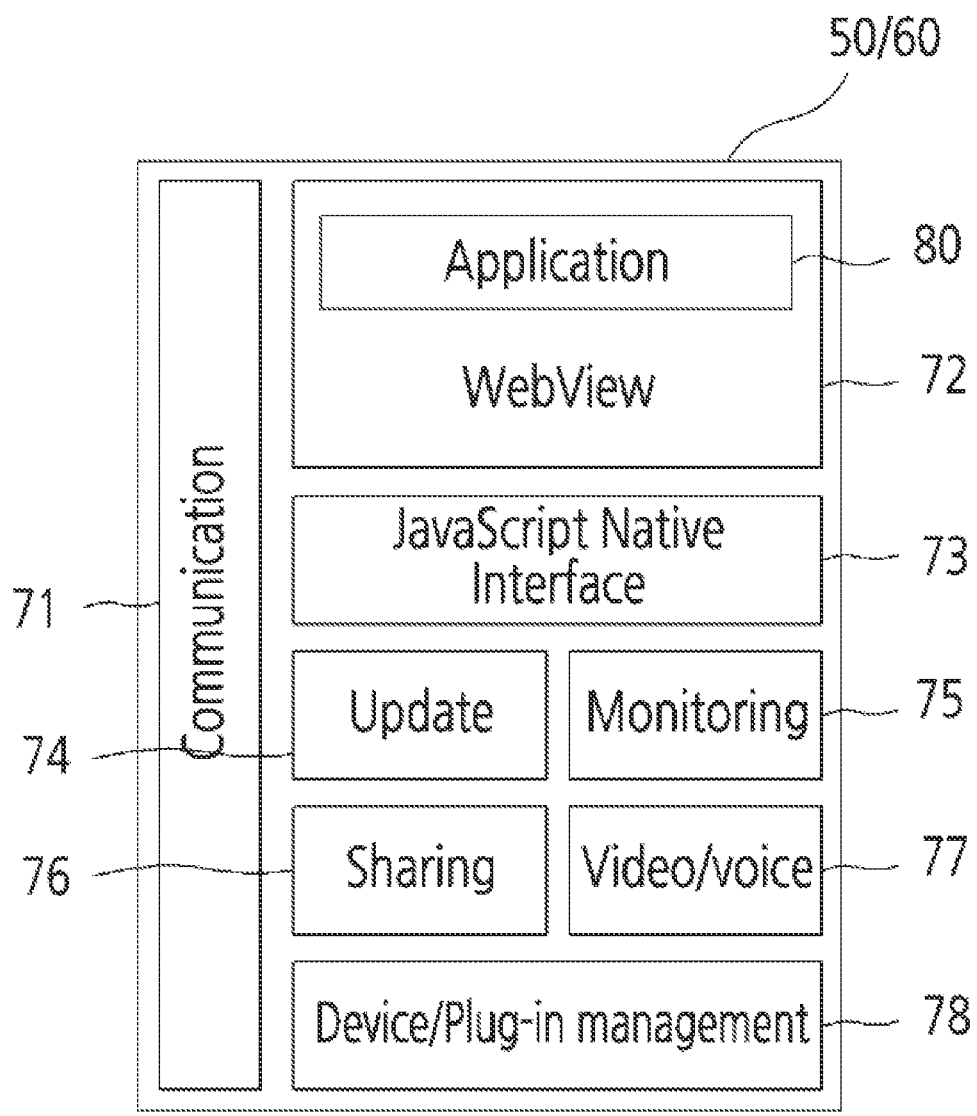
FIG. 2 is a schematic diagram of a client side (work support terminal) included in the work support system with device sharing according to one embodiment of the present invention.

FIG. 1 is a schematic diagram of a work support system with device sharing according to one embodiment of the present invention, and FIG. 2 is a schematic diagram of a client side (work support terminal) included in the work support system with device sharing according to one embodiment of the present invention.

Work support system with device sharing according to one embodiment of the present invention may enable efficient and rapid work process by allowing a user terminal to share a hardware device that is not directly connected to the user terminal for a work that requires the hardware device during work process.

Referring to FIG. 1, the work support system 1 with device sharing according to one embodiment may include a work support server 10, a customer terminal 60, an employee terminal 50, and a device terminal 90. The work support server 10, the customer terminal 60, the employee terminal 50, and the device terminal 90 may be connected through a wired/wireless network.

The employee terminal 50 is a terminal device operated by an employee as a service provider who provides a specific service. The terminal device may be a computing device such as a smartphone, a tablet PC, a notebook computer, a desktop PC, or the like, in which a work support-related application or program (hereinafter collectively referred to as an application) is loaded or installed through download and an operating system capable of executing the application is installed.

The customer terminal 60 is a terminal device owned or operated by a customer who is a user who is provided with a specific service. The customer terminal 60 is also a computing device such as a smartphone, a tablet PC, a notebook computer, a desktop PC, or the like, in which the work support-related application according to the present embodiment is loaded or installed through download and an operating system capable of executing the application is installed.

The device terminal 90 is a terminal device that is directly connected to the hardware device 95 required for work process via wired/wireless network and controls the hardware device 95, The device terminal 90 is also a computing device such as a smartphone, a tablet PC, a notebook computer, a desktop PC, or the like, in which the work support-related application according to the present embodiment is loaded or installed through download and an operating system capable of executing the application is installed.

The hardware device 95 is a device configured of performing work-related function. The hardware device 95 executes a predetermined operation according to a control command. For example, the hardware device 95 may include a card printer, an OTP (One-time password) printer, a printer, a (ID card, document, etc.,) scanner, USIM (Universal SIM) certifier and so on.

The work support server 10 is a server device that communicates with the customer terminal 60, the employee terminal 50 and the device terminal 90, and makes it possible to share the hardware device 95 directly connected to the device terminal 90 in a user terminal (the customer terminal 60 or the employee terminal 50) upon request, and allows the hardware device 95 to provide the requested service quickly and smoothly.

In addition, the work support server 10 may provide a service to the customer by transmitting all or part of the screen displayed on the customer terminal 60 to the employee terminal 50 to enable screen sharing.

The work support server 10 may include a device sharing server 11, a work sharing server 12, a session management server 13, and a push server 14, all included in an execution architecture. Additionally, it may further include one or more of a monitoring server 15, a plug-in management server 16, a user account management server 17, and an update server 18, all included in an operation architecture.

The device sharing server 11 may facilitate smooth work processing by communicating with the user terminal (the customer terminal 60 or the employee terminal 50) and the device terminal 90 and allowing sharing of the hardware device by transmitting a request for sharing device of the user terminal to the device terminal 90.

The device sharing server 11 manages a device list and status connected to the device terminal 90. And the device sharing server 11 shares so that the other terminals (e.g., the user terminal) may access and use the device 95 included in the device list.

For this, the device sharing server 11 may manage reception, transmission, and validity of the request for sharing device. The device sharing server 11 may further manage status, right and so on of the hardware device 95.

The work sharing server 12 manages access information of application users (customers, employees, etc.). In addition, the work sharing server 12 provides a link function between the server and the application for sharing screens and/or data between users.

The session management server 13 manages right and authentication for the application user to access an API gateway.

The push server 14 transmits messages such as various announcements and news to the application.

The monitoring server 15 monitors and collects the status of the terminal (employee terminal 50, customer terminal 60, device terminal 90, and so on) in which the application is running. The monitoring server 15 may respond to a failure by analyzing the collected data, and may provide information on the terminal status upon request.

The plug-in management server 16 registers and manages plug-ins associated with the application. The plug-in management server 16 may provide necessary plug-in information in conjunction with the build process.

The user account management server 17 manages accounts of application users (customers, employees, etc.).

The update server 18 provides a function of distributing and installing applications, plug-ins, or related files.

Referring to FIG. 2, it is a schematic diagram of the user terminal (customer terminal 60 or employee terminal 50) in which an application is loaded or installed after downloading.

The user terminal may include a communication module 71, a web view module 72, an interface module 73, an update module 74, a monitoring module 75, a sharing module 76, and a video/voice module 77, a device/plug-in management module 78.

The communication module 71 communicates with the work support server 10 to transmit and receive various data and files. The communication module 71 may include a mobile communication device such as 3G, 4G, or 5G and/or a short-range communication device such as Bluetooth, Wi-Fi or LAN. Data and files transmitted and received through the communication module 71 are encrypted through an encryption module (not shown), so that hacking may be prevented.

The web view module 72 displays a screen according to the execution of the application 80.

The interface module 73 may be a native interface, for example, a JavaScript native interface.

The update module 74 receives files distributed by the update server 18 through the communication module 71 and updates the application, plug-in, or related module.

The monitoring module 75 collects various data and logs about the terminal status when the application is executed, and transmits it to the monitoring server 15 through the communication module 71.

The video/voice module 77 supports a video call or a voice call between an employee and a customer to enable a non-face-to-face service when a service is provided. In case of a voice call, the video/voice module 77 may include a microphone and a speaker, and in the case of a video call, the video/voice module 77 may further include a camera.

The device/plug-in management module 78 manages devices and plug-ins associated with the application. The managed device may include the hardware device 95 that may be shared.

The sharing module 76 provide a device sharing function.

The device sharing function may allow the hardware device 95 (e.g., printer, card printer, etc.) connected to a specific device terminal 90 to be accessed from the user terminal (customer terminal 60 or other employee terminal 50) that is not directly connected to the hardware device 95 to perform work (printing out, card issuance, etc.) through the hardware device 95.

The sharing module 76 may provide a work sharing function. Work sharing may include screen sharing and/or data sharing.

The work sharing function, particularly, the screen sharing function shares all or part of the screen of the customer terminal 60 to be displayed in a designated area of the employee terminal 50 when interconnections for work support are established between a plurality of terminals desiring to be interconnected in a predetermined method, thereby enabling the employee to smoothly perform work or help the customer without directly handling the customer terminal 60.

The work support system and method with device sharing and/or screen sharing according to one embodiment may be utilized as follows.

In the digital environment of the financial sector based on the digital transformation, financial sales staff may collaborate and share tasks such as electronic signatures, financial product design, and payment requests between customers and employees in environments such as ODS (Out Door Sales) and mobile branch regardless of device types. It may also be used for digital kiosks linked to biometric authentication systems without a bankbook or a card.

When building a warship combat system where security is essential in the defense field, it enables access and control of various hardware such as weapons and sensors, supports high-level security requirements, and supports offline operation to ensure normal operation in case of network disconnection.

In the field of e-learning, it is possible to enable the interaction between the teacher and the student to provide an e-learning service by sharing the teacher's teaching and course contents with the remote student's terminal. By sharing the electronic blackboard and the terminals of students, collaborative classes through two-way communication are possible, and interactive collaborative classes between teachers and students may be made by using the push function.

As a public service for the public, it is possible to share a kiosk for self-authentication when entering/exiting an airport/port, an unmanned certificate issuing machine, and so on with the customer's terminal environment, and the governmental agencies' face-to-face/non-face-to-face sharing services become possible.

In the digital twin-based manufacturing environment, the dynamic simulation of physical objects and systems may be digitized with a focus on the manufacturing field, and the user terminal environment for the simulation of the design, operation, and maintenance of production facilities, and virtualization training of field workers may be performed through collaboration and sharing.

In the digital medical field, it may be used to build a telemedicine system that supports real-time sharing of biometric information collected through IoT devices, and interworking with medical devices and EMR (Electronic Medical Record) systems may be used.

In the collaborative software development environment, shared development tools that enable knowledge sharing and real-time code review in collaboration, co-ownership, and horizontal relationships may be supported.

Hereinafter, a work support method performed in the work support system with screen sharing according to one embodiment will be described with reference to accompanying drawings. For the convenience of understanding and explanation of the present invention, it is assumed that the present invention is applied to ODS in the financial sector.

FIGS. 3 and 4 exemplarily illustrate a work support process with screen sharing according to one embodiment of the present invention, FIG. 5 exemplarily illustrates a work screen sharing between a customer terminal and an employee terminal, and FIG. 6 exemplarily illustrates screen views.

A customer service procedure in a smart branch is shown in FIG. 3.

In S100, when the customer visits the branch, it is determined whether the work will be handled face-to-face or by himself.

In S105, in case of customer self-processing, the customer may process by her/himself works that are used to be done at the teller window such as deposit/withdrawal/remittance at ATM (Automated Teller Machine), or new/reissued card, OTP issuance, bankbook reissuance, password change and so on at STM (Smart Teller Machine, Self Teller Machine).

In S110, in case that the customer wants to process face-to-face with the employee, it is determined whether the bank application is installed in the first customer terminal 61 (mobile phone, smart phone).

In S115, if the bank application is installed, the employee terminal 50 and the first customer terminal 61 may be linked to process work through screen/data sharing.

In S120, if the bank application is not installed, the work may be processed by linking the second customer terminal 62 (a tablet or PC owned by the bank, provided for the customer to use) provided at the window and the employee terminal 50.

The first customer terminal 61 and the second customer terminal 62 are terminals in which the bank application is installed, and the former is owned by the customer and the latter is owned by the bank, but there is something in common that both are operated by the customer in processing bank work.

The procedure of processing works in association between the employee terminal 50 and the first customer terminal 61 in S115 will be described in more detail with reference to FIG. 4.

In S200, in order to identify the terminal that wants to share the screen and establish the interconnection, first, an identification code (e.g., QR code) is generated and displayed in the employee terminal 50.

In S205, in the first customer terminal 61, by taking the identification code displayed on the employee terminal 50 using a camera, information about the employee terminal 50 to be shared is extracted, and the interconnection between the employee terminal 50 and the first customer 61 may be established to start sharing.

Although it has been described assuming that the generation of the identification code is made in the employee terminal 50, but this is only one embodiment. It should be understood that the identification code may be generated in the first customer terminal 61 and captured by the employee terminal 50 to establish the interconnection.

That is, when there are two terminals that wish to establish the interconnection, the identification code may be generated in any one of two terminals, and the other terminal may capture the generated identification code and extract information about the terminal that generated the identification code to establish the interconnection for sharing (screen and/or data) between the two terminals.

In S210, when the interconnection is established, a required work screen among the screens of the shared first customer terminal 61 is shared. The work screen sharing may be performed for whole area or a predetermined portion of area (screen area A) of the application execution screen of the first customer terminal 61. An area to be shared in the work screen of the first customer terminal 61 may be determined by the user. That is, when the screen of the first customer terminal 61 is divided into several areas, the user may select at least one area to be shared by gesture such as touch or drag.

In the employee terminal 50, a shared screen may be displayed at a predetermined location. In FIG. 4, the shared screen (customer screen) may be displayed in area A, and contents (work area, common area) corresponding to the shared screen for smooth work processing may be displayed in areas B and C.

Referring to FIG. 5, a case in which the work screen is shared between the first customer terminal 61 and the employee terminal 50 is illustrated. In the predetermined area A of the employee terminal 50, the customer screen may be mirrored and displayed.

In S215, the first customer terminal 61 may receive customer input by outputting items requiring customer input through the shared screen. In this case, it is possible to minimize customer input items so as not to cause customer inconvenience.

Depending on the customer input, depository works such as card issuance, OTP issuance, bio information registration and credit works such as electronic signature for loan application may be processed.

In S220, it is also possible to register a bio-authentication medium using a fingerprint, iris and so on through the bank application installed in the first customer terminal 61, and then use it as a self-authentication means in an ATM (or STM) device. In this case, the first customer terminal 61 transmits only the authentication result rather than the bio-authentication information as it is, so that sensitive personal information may be protected.

In S225, by connecting a bank device such as a card issuer, a card-type OTP issuer, a printer and so on commonly used in the branch with the employee terminal 50, it becomes possible to process works that were previously processed at the teller window. Alternatively, if there is a device terminal directly connected to the bank device, the first customer terminal 61 or the employee terminal 50 may acquire a right to access the bank device through the request for sharing device and control the bank device through the device terminal so as to process work that needs the hardware device. This will be described in detail.

In one embodiment, screen sharing is performed between two different devices for work support. In this case, the two devices may have displays having different specifications.

Accordingly, a screen view in One Source Multi Use (OSMU) method that may enlarge or reduce the same screen to match the resolution of various devices including smartphones, tablets, and PCs may be applied.

Referring to FIG. 6, it is possible to display the same customer screen on PC and tablet or smartphone by enlarging or reducing the shared screen at a certain ratio.

As shown in FIG. 5, in case that the employee terminal 50 shares the customer screen, the screen view may be applied to the work area, so that screen scrolling due to mirroring of the customer screen may be minimized. For example, when the size of a display device for displaying content decreases, horizontal scrolling and vertical scrolling may occur simultaneously. In such a situation, needs for scrolling may be minimized through the screen view function that changes the screen size so that horizontal scrolling does not occur.

FIG. 7 exemplarily illustrates a procedure of a screen sharing process for work support.

In FIG. 7, a case in which the identification code is generated by the first customer terminal 61 is illustrated.

In S300, when the bank application is executed and a share request is input from the customer, the first customer terminal 61 requests the creation of a token for work sharing to the work support server 10. The work support server 10, particularly the work sharing server 12, generates and provides the token for identifying the terminal according to the request from the terminal.

In S305, the first customer terminal 61 generates the identification code including the token and access information (encrypted URL information including authentication information) included in the response received in response to the token generation request. The identification code may be, for example, QR code.

In S310, the generated identification code is transmitted to the employee terminal 50 that needs sharing. As one example of delivering the identification code, a method of acquiring image data by capturing the identification code displayed on the screen of the first customer terminal 61 with the camera of the employee terminal 50 may be applied.

In S315, the employee terminal 50 transmits a shared screen request including the identification code and logged-in employee information to the work support server 10. By using the session management server 13 and the user account management server 17, it is checked whether the employee who uses the employee terminal 50 has the necessary right.

In addition, information necessary for accessing the screen shared by the customer (identification code) may be transmitted to the work sharing server 12 to establish a connection. The work support server 10 compares the token included in the shared screen request of the employee terminal 50 with the token generated in S300 to verify whether the request is valid, and if the two tokens are identical, allows access to the shared screen.

In S320, the work support server 10 accesses the shared screen among the application screens executed in the first customer terminal 61 according to the access information, and transmits the shared screen to the employee terminal 50, so that establishes the interconnection between the first customer terminal 61 and the employee terminal 50 and enables the screen sharing (may include data sharing).

In a state of screen sharing, the employee may access the customer terminal and perform controls for smooth work processing.

In the state of screen sharing, a device sharing process may be additionally performed. This will be described in detail with reference to related drawing.

In the above, the screen sharing through the first customer terminal 61 possessed by the customer has been mainly described. The second customer terminal 62 owned by the bank may be similarly screen-shared. In case of the second customer terminal 62, in order for the customer to log in, after performing customer authentication by checking the customer's ID card or by using the customer's biometric information (vein, fingerprint, etc.) registered in the bank, the screen sharing for processing works could be made.

In addition, as described above, in another embodiment, the identification code may be generated and output from the employee terminal instead of the customer terminal, and interconnection may be established by capturing it with the customer terminal as well.

Hereinafter the work support method performed in the work support system with device sharing will be described with reference to related drawings.

FIG. 8 exemplarily illustrates a work support process with device sharing according to one embodiment of the present invention, FIG. 9 exemplarily illustrates a block diagram of device sharing server, and FIG. 10 exemplarily illustrates the method for shared use of device.

The device sharing process in the smart branch is shown in FIG. 8.

As aforementioned, the first customer terminal 61 and the employee terminal 50 are connected to allow the screen sharing.

In the state of screen sharing, the customer or the bank employee may need to use various bank devices 95 while processing bank works. Bank work requiring devices may include an issuance of card using card printer, an issuance of OTP using OTP printer, and an issuance of bankbook or a clearing bank account using a bankbook printer.

In S410, the bank employee may transmit the request for sharing device to the sharing server (particularly, the device sharing server 11) using the employee terminal 50.

Alternatively, the customer may transmit the request for sharing device to the employee terminal 50 in S400, and the employee terminal 50 may transmit it to the device sharing server 11.

In S420, when receiving the request for sharing device, the device sharing server 11 transmit the request to the device terminal 90 that is directly connected to the device 95.

The device sharing server 11 may verify user's right in relation to the terminal that has sent the request for sharing device, and restrict accessible devices. In this case, the user's right may be verified through the session management server 13 of the work support server 10.

In S430, the device terminal 90 controls access to the device 95 corresponding to the request to allow shared use.

Thereafter, the use terminal may proceed with work processing using the device for which shared use is allowed.

Referring to FIG. 9, the device sharing server 11 may include a device directory management unit 111, a device status heck unit 113, and a device control unit 115.

The device sharing server 11 may perform a device directory function and a proxy server function for transferring device control information.

The device directory management unit 111 registers and manages a shareable device in the device directory.

The device directory management unit 111 identifies the device terminal 90 directly connected to the device 95 that may be shared or requires sharing, and registers device information and device terminal information in the device directory by associating device information and device terminal information.

A selection of device for sharing with other users among devices 95 connected to a certain device terminal 90 is inputted. And, user, group, and right are set for each selected device 95. Identification information of the device, connected terminal information, and setting information may be synchronized and stored in the device directory.

The device status check unit 113 checks and updates the current status of the device 95 registered in the device directory. The device terminal 90 transmits device status information including one or more of device use availability (ON, OFF, IN USE, AVAILABLE) and device location at the request of the device status check unit 113 or at preset intervals.

When receiving the request for sharing device from the user terminal, the device control unit 115 checks the device directory to confirm the right of the user (requestor) who sent the request, and enables access control within a range corresponding to the right.

For example, access is not granted in the case of a request from an unauthorized user. In the case of a request from a user with limited rights, access is allowed, but device use may be made possible only within a limited range.

In addition, the device control unit 115 may compare the location information of the requester in the request for sharing device with the location of the device registered in the device directory so that a device in a relatively short distance is given high priority.

Referring to FIG. 10, method for shared use of device is illustrated.

The device registration procedure is as follows.

In S500, when the device 95 to be shared is connected, the device terminal 90 transmits the device information to the device sharing server 11 to perform device registration.

Device information in the device registration procedure may include device identification information, device terminal information, shareable users and/or groups, and right setting information for each right.

Device information transmitted in the device registration procedure may be information that is synchronized to the device directory managed by the device sharing server 11.

The device status update procedure is as follows.

In S505, the device terminal 90 may check and update device status information on the connected device 95 when there is a request from the device sharing server 11 or at a preset period. The device status information may include one or more of device use availability (ON, OFF, IN USE, AVAILABLE) and the device location.

The procedure for using the device is as follows.

In S510, the user terminal (customer terminal 60 and/or employee terminal 50) requests the sharing information about the device required for work processing to the device sharing server 11.

In S515, the device sharing server 11 sets the device priority based on the right and location information of the requestor who requested the device sharing information.

The device sharing server 11 checks the device directory to see if the requestor has right to use the device, and retrieves a list of adjacent device terminals based on the requester's network information and GPS location information. It is possible to filter device connected to the adjacent device terminal by a required device type. In addition, it is possible to generate the device list sorted by priorities assigned to devices according to whether the device terminal is logged in and availability of the device that are checked through the device status information.

In S520, the device list including accessible devices sorted according to the priorities generated in S515 is transmitted to the requestor (user terminal). Alternatively, the device sharing server 11 may generate a device list including accessible devices in consideration of only availability of the device, without considering the requestor's right, and transmit it to the requestor.

In S525, the requestor may check the device list, and sequentially make requests for shared device (shared use) from a device having a high priority. The priority is data presented for reference, and the requestor may make the request for shared use by selecting any one of accessible devices regardless of the priority.

In S530, when receiving the request for shared use, the device sharing server 11 may determine whether the requestor is allowed to share the device corresponding to the request.

In S535, the device sharing server 11 allows shared use only when the requestor is a user allowed to share use. Users who are not allowed to share use may be notified that the request for shared use has been rejected.

However, if the device list is already limited to accessible devices when the device list is transmitted in S520, S530 and S535 may be omitted.

In S540, the user terminal transmits a use command, which is necessary for work processing, for the device selected from the device list to the device sharing server 11.

In S545, the device sharing server 11 transmits the use command to the device terminal 90.

In S550, the device terminal 90 controls the device 95 corresponding to the device use command to perform an operation corresponding to the use command. The requestor's desired work processing may be performed through this device control.

In S555, the device terminal 90 transmits a control result to the device sharing server 11. The device control result transmitted to the device sharing server 11 may be transmitted to the user terminal.

The work support system and method with device sharing according to the present embodiment may enable device sharing even when the user terminal and the device terminal are not on the same network, and are different from the conventional printer sharing. That is, in the present embodiment, the first network through which the device sharing server is connected to the user terminal and the second network through which the device sharing server is connected to the device terminal may be different from each other.

It may also be shared with PCs, tablets, and smartphones. For example, a device linked to a PC may be used on a mobile device, and a device connected to a tablet via Bluetooth may be used on the PC.

In addition, an application program may restrict the accessible devices according to the user's right.

FIG. 11 exemplarily illustrates an architecture of a multi-platform application development system according to another embodiment of the present invention.

As described above, the multi-platform application may be an application for performing work support with screen sharing between two devices running on different platforms.

Referring to FIG. 11, each component of the work support server 10 may be included in the execution architecture (device sharing server 11, work sharing server 12, session management server 13, push server 14, etc.) and the operation architecture (monitoring server 15, plug-in management server 16, user account management server 17, update server 18, etc.).

In addition, the work support server 10 may include a build distribution master server 30 included a development architecture. The build distribution master server 30 manages and controls a build node 31 managing builds of applications provided to developers and service operators and a distribution node 32 performing distribution process.

The build node 31 provides a service for generating an executable file that may be executed on Android, iOS, Windows, Linux, and Kiosk platforms.

The distribution node 32 distributes an application to one or more stores provided by various platforms, such as AppStore, PlayStore, and Microsoft Store, or distributes directly using its own update server 18.

The above-described work support method may also be implemented in the form of a non-transitory recording medium including instructions executable by a computer, such as an application or program module executed by a computer. Non-transitory computer-readable medium may be any available media that may be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described work support method may be executed by an application (which may include a program included in a platform or operating system by default installed in the terminal) installed by default in the terminal, and by an application (i.e., program) that a user manually installed in the terminal after downloading from an application store server, or an application providing server such as a web server related to the application or service. In this sense, the above-described work support method with screen sharing may be implemented as an application (i.e., program) installed by default in the terminal or manually installed by a user, and may be recorded in the non-transitory computer-readable recording medium such as the terminal.

While the invention has been described above with reference to exemplary embodiments, it will be understood by those skilled in the art that the invention may be modified and changed in various forms without departing from the concept and scope of the invention described in the appended claims.

What is claimed is:

1. A work support system with device sharing, comprising:
a user terminal in which a service application is installed and executed;
a device configured for executing a predetermined operation according to a control command;
a device terminal directly connected to the device; and
a device sharing server configured for enabling the user terminal to use the device by communicating with the user terminal and the device terminal, managing information of the device that is sharable, and allowing a sharing of the device under a predetermined condition in response to a request for sharing device from the user terminal,
wherein the device sharing server performs a device directory function and a proxy server function for transmitting device control information,
wherein the device sharing server comprises:
a device directory management unit configured for registering and managing the device that is shareable in a device directory,
a device status check unit configured for checking and updating a current status of the device registered in the device directory, and
a device control unit configured for, when receiving the request for sharing device from the user terminal, checking the device directory to confirm a right of a user who sent the request for sharing device, and enabling access control within a range corresponding to the right,
wherein the device control unit compares a location information of the user included in the request for sharing device with a location of the device registered in the device directory so that a device in a relatively short distance is given high priority,
wherein the user terminal is a customer terminal in which a service application is executed or an employee terminal configured for sharing and displaying a designated area of an execution screen of the service application,
wherein the work support system further comprises a work support server configured for communicating with the customer terminal and the employee terminal, and supporting a customer work by setting a screen of the customer terminal to be shared in the employee terminal under a specified condition,
wherein the work support server generates a token in response to a token generation request for work sharing from a first terminal, which is one of the customer terminal and the employee terminal, transmits the token to the first terminal, compares a token included in a sharing request from a second terminal, which is remaining one of the customer terminal and the employee terminal, with the token that is transmitted to the first terminal, and allows a screen sharing if the two tokens are identical, wherein the first terminal generates an identification code including the token and an access information to the work support server and outputs the identification code on screen, and wherein the second terminal captures the identification code, and generates the sharing request including the identification code.

2. The work support system with device sharing of claim 1, wherein a first network through which the device sharing server is connected to the user terminal and a second network through which the device sharing server is connected to the device terminal are different from each other.

3. The work support system with device sharing of claim 1, wherein one or more of an identification information of the device, a connected terminal information of the device terminal directly connected to the device, shareable users and/or groups, and a right setting information for each right are synchronized and stored in the device directory.

4. The work support system with device sharing of claim 1, wherein the device status check unit receives and updates a device status information including one or more of a device use availability and device location from the device terminal at the request of the device status check unit or at preset intervals.

5. A work support method performed in a work support system with device sharing having a user terminal, a device terminal and a device sharing server, comprising:

in a device sharing server, receiving a device information from a device terminal and performing a device registration when a device to be shared is connected to the device terminal;

in the device sharing server, synchronizing the device information to a device directory;

in the device sharing server, receiving a request for sharing device from a user terminal;

in the device sharing server, generating a device list in which a priority of the device is set based on a right of a user corresponding to the request for sharing device and a location information of the device with reference to the device directory to transmit the device list to the user terminal;

in the device sharing server, receiving a request for shared use for the device in the device list from the user terminal; and in the device sharing server, transmitting a control command according to the request for shared use to the device terminal to control the device according to the control command, wherein the device sharing server performs a device directory function and a proxy server function for transmitting device control information, wherein the generating the device list compares the location information of the user included in the request for sharing device with the location of the device registered in the device directory so that a device in a relatively short distance is given high priority, wherein the generating the device list comprises:

checking the device directory to see if the user has a right to use the device, retrieving adjacent device terminal based on the user's network information and GPS location information, and generating the device list by assigning priority according to an availability of the device that is checked through a device status information to the device that is connected to the adjacent device terminal and sorting by the priority, wherein the user terminal is one of a customer terminal and an employee terminal, wherein the method further comprises:

transmitting a token generation request for work sharing from the customer terminal in which an application is executed to the work support server;

generating a token in response to the token generation request in a work support server and transmitting the token to the customer terminal;

generating an identification code including the token and an access information to the work support server in the customer terminal to output on a screen;

capturing the identification code on the screen of the customer terminal with the employee terminal;

transmitting a sharing request including information of an employee who operates the employee terminal with the identification code from the employee terminal to the work support server;

determining whether the token extracted from the identification code included in the sharing request is identical to the token transmitted to the customer terminal in the work support server; and transmitting a screen of the customer terminal to the employee terminal if the two tokens are identical, so that a screen sharing is performed.

* * * * *